United States Patent [19]

Bottum

[11] 4,379,390
[45] Apr. 12, 1983

[54] ICE-MAKING EVAPORATOR

[76] Inventor: Edward W. Bottum, 9357 Spencer Rd., Brighton, Mich. 48116

[21] Appl. No.: 772,539

[22] Filed: Feb. 28, 1977

[51] Int. Cl.³ .............................................. F25C 5/08
[52] U.S. Cl. .................................. 62/354; 29/421 R; 165/169
[58] Field of Search .................. 62/DIG. 7, 354, 395; 165/140, 141, 169; 29/421 R

[56] References Cited

U.S. PATENT DOCUMENTS

| | | | |
|---|---|---|---|
| 1,930,220 | 10/1933 | Askin | 62/395 |
| 1,995,167 | 3/1935 | Battles | 62/DIG. 7 |
| 2,436,389 | 2/1948 | Kleist | 62/DIG. 7 |
| 2,621,903 | 12/1952 | Cohler | 165/169 X |
| 3,196,624 | 7/1965 | Reynolds | 62/354 X |
| 3,228,202 | 1/1966 | Cornelius | 62/347 X |
| 3,435,633 | 4/1969 | Dixon | 62/347 X |
| 3,546,763 | 12/1970 | Pasternak | 29/421 X |
| 3,553,976 | 1/1971 | Cumine et al. | 165/169 X |
| 3,648,477 | 3/1972 | Shartle | 165/169 X |
| 3,739,842 | 6/1973 | Whalen | 62/395 X |
| 4,061,184 | 12/1977 | Radcliffe | 165/169 X |
| 4,087,986 | 5/1978 | Grahl | 62/354 |

*Primary Examiner*—William E. Tapolcai
*Attorney, Agent, or Firm*—Barnes, Kisselle, Raisch, Choate, Whittemore & Hulbert

[57] ABSTRACT

An ice-making evaporator and method for fabrication thereof is provided. The evaporator includes a hollow tubular member on which is provided a tubular coil. The tubular coil is expanded into tight engagement with the tubular member. Refrigerant is passed through the tubular coil and expanded to cause freezing of water which is flowed over the tubular member. The ice-making evaporator may be used per se as an ice-making device or it may be used as the evaporator of a heat pump system to not only make ice but improve efficiency of operation of the heat pump system.

2 Claims, 4 Drawing Figures

ICE-MAKING EVAPORATOR

BACKGROUND OF THE INVENTION

National attention has recently turned toward the conservation and efficient utilization of energy. This has come about as a consequence of the recognition of the finite amount of non-renewable fossil energy sources which have formed the energy basis for modern industrial societies. One technique being widely explored at the present time is the utilization of solar energy as a source of heat for buildings. One proposed system for the use of solar heat is to provide solar collecting apparatus exteriorly of the building structure. Such apparatus is used to collect solar energy. The solar energy so collected is either transferred directly to a heat pump system which includes a condenser from which heat is extracted for heating purposes or stored in heat sink type structure for a period of time and transferred to the heat pump system as needed.

In accordance with the present invention, an ice-making evaporator is provided. The ice-making evaporator is particularly useful as an evaporator for a heat pump. When used in conjunction with a heat pump, the ice-making evaporator serves a dual purpose. Firstly, it increases the efficiency or capacity of the heat pump. This is accomplished as a consequence of the evaporator raising the coefficient of performance of the heat pump by permitting the heat pump to operate at a higher evaporator temperature. Water is flowed over the evaporator, causing ice to form. For every pound of ice formed from the water, approximately 144 B.T.U.s will be absorbed. Consequently, less water (only 1/144 as much) will be used than with known hydronic type heat pumps. The second advantage of the ice-making evaporator is that the ice produced thereby may be used as ice. The ice thus produced is substantially free of expense. Because rather large amounts of ice are produced, the ice must be disposed of, for example, commercially or stored, as in an insulated chamber or tank, until the arrival of warm weather. The ice can then be used in air conditioning, very much as in the presently known Annual Cycle Energy System.

The invention is not, however, restricted to use in connection with a heat pump. The ice-making evaporator may be used independently for commercial ice making.

In one aspect of the invention, novel means are provided for fabricating the ice-making evaporator. The method involves fluid expansion of a tubular coil over a large tube to place large surface areas of the tubular coil in pressure contact with the larger tube. The resultant ice-making evaporator is sturdy in construction, reliable in use, and does not involve any moving parts.

SUMMARY OF THE INVENTION

An ice-making evaporator and method of manufacture is provided. The evaporator includes an elongated hollow tubular member having an outer surface and an inner surface. A helical tubular coil for the expansion of refrigerant is provided on one of the outer and inner surface of the tubular member. The helical coil is expanded by means of fluid pressure to flatten surface portions in pressure contact with the tubular member. One portion of the coil comprises a fluid inlet while the other end of the coil comprises a fluid outlet. The evaporator is useful for a primary ice-making capacity or as the evaporator of a heat pump system to improve system efficiency.

Figure 1:
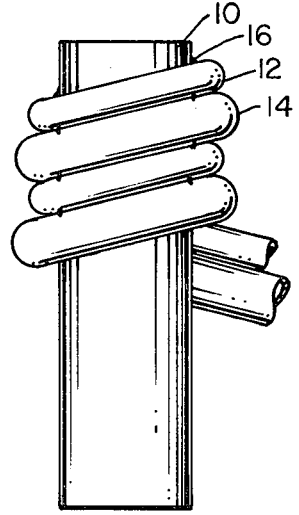
FIG. 1 is a view illustrating the method of fabrication of an ice-making evaporator forming one embodiment of the present invention.

Referring to FIG. 1, it will be noted that an elongated central tubular member 10 of relatively large diameter is provided over which tubular coils comprising two separate tubes 12, 14 is helically wrapped. The tube 10 is preferably fabricated of a material which is corrosion resistant and a good heat conductor, such as copper, a copper alloy or stainless steel. The tube 10 may, for example, have an outside diameter of 5½ inches and a wall thickness of 0.065 inch.

Before wrapping the tubes 12, 14 onto the tube 10 to form the tubular coil, one end of the tubes 12, 14 is tacked, as at 16, to the tube 10 to hold them in place. Tacking may be accomplished, for example, by brazing. The tubes are then rolled onto the tube 10 to form the desired tubular coils. The tubes 12, 14, being firmly held in place, may be rolled onto the tube 10 and will be flattened appreciably thereagainst.

The tubes 12, 14 are preferably fabricated of a soft material, such as copper, a copper alloy or aluminum. Copper is preferred because it is corrosion resistant, whereas aluminum is subject to deterioration as a consequence of corrosion caused by electrolysis.

Copper tubing is preferably annealed to the dead soft condition before being wrapped onto the tube 10. The annealing process may be accomplished at temperature ranges of from 900° Fahrenheit to 1800° Fahrenheit, annealing at 1600° Fahrenheit being preferred.

Figure 2:
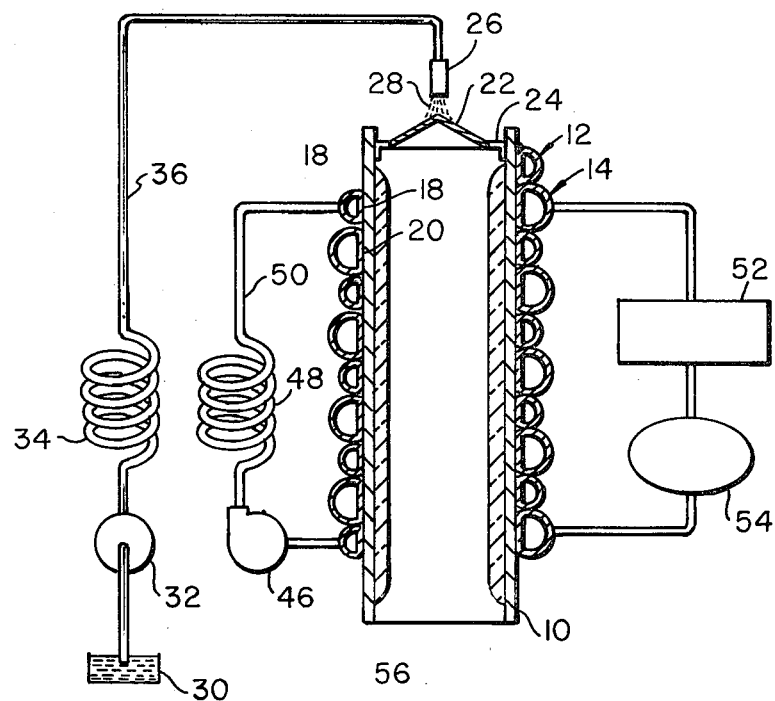
FIG. 2 is a view in section of the completed ice-making evaporator of FIG. 1 illustratively integrated into an overall system.

After the tubes 12, 14 have been wrapped onto the tube 10 so as to form the desired coils, both coils are expanded by means of fluid under pressure, preferably hydraulically, so that a flat surface 18, 20, as viewed in FIG. 2, is formed against the tube 10. The fluid expansion may be accomplished by plugging one end of the tubes 12, 14 and applying fluid pressure at the other end. It will be noted that there is a relatively large surface area 18, 20 in contact with the outer surface of the tube 10. The contacting area is not only large, as opposed to a round tube, but is also under pressure so as to result in excellent thermal contact between the tube 10 and coils. The portions of the tubes 12, 14 opposite from the surfaces 18, 20 tend to be oval or hemispherical as a consequence of the fluid pressure which has been applied.

A conically shaped baffle 22 is mounted at the upper end of the tube 10 and attached thereto by means of feet 24. A water nozzle 26 is provided above the baffle 22. Water 28 emitted therefrom is splashed against the interior surfaces of the tube 10. Water is supplied from a source 30 to the nozzle 26 by means of a pump 32, coil 34 and line 36.

The coils 12, 14 are, respectively connected to a system for providing warm fluid flow and as the evaporator of a refrigeration system. As will be noted in FIG. 2, a pump 46 and coil 48 are provided in line 50 which is connected to the upper and lower ends of coil 12 to result in a closed circuit therethrough. Brine liquid may be pumped through coil 12. The coil 48 may be placed in heat exchange relationship with a relatively warm fluid, as shown the water which flows through the coil 34. Such brine liquid may also be heated as part of a solar collector system in which the coil 48 forms part of a collector. Alternately, warm fluid from the refrigeration system may be bypassed through the coil 12.

The coil 14 is operatively connected as the evaporator unit in a refrigeration system which includes a condenser 52 and compressor 54. As is conventional, cold refrigerant gases exiting from the coil 14 are compressed by compressor 54. The compressed, hot gases are emitted from compressor 54 to the condenser 52 wherein the gases are condensed to a liquid state. This high pressure liquid is then passed through an expansion valve into the coil 14 where it evaporates, resulting in temperatures below the freezing temperature of water.

Operation of the ice-making evaporator may now be understood. Water is sprayed on the inner surface of tube 10 by means of nozzle 26. The inner surface of tube 10 becomes very cold as a consequence of the expansion of the refrigerant in coil 14. This causes the water to form a cylinder of ice 56. The ice may reach a thickness of, for example, one-quarter to three-eighths of an inch or whatever dimension is required. The thickness depends upon the length of time water is sprayed into tube 10 and refrigerant is evaporated in the coil 14. When the desired thickness of ice 56 is reached, pump 46 is actuated to cause warm fluid to pass through coil 12. At this time, the flow of liquid refrigerant into the coil 14 is discontinued. The outer surface of the cylinder of ice 56 will melt, causing the cylinder of ice 56 to fall out of the tube 10 as a consequence of gravity. A hopper, container or insulated bin is provided beneath tube 10 to catch and store the ice. This process is continued, resulting in the formation of quantities of ice.

It is readily seen that an inexpensive method of making ice by means of an ice evaporator, which has no moving parts, is provided. The ice thus formed is particularly useful in situations where the shape or size of the ice does not have to be of a specified type.

As will be appreciated, automatic controls may be provided to cause the refrigeration system to cycle as required and harvesting to occur as required. A multiple number of ice-making evaporators may be connected to a single condensing unit and mounted over ice receiving bins. It may readily be arranged so that part of these evaporators are harvesting ice while other evaporators are making ice.

Figure 3:
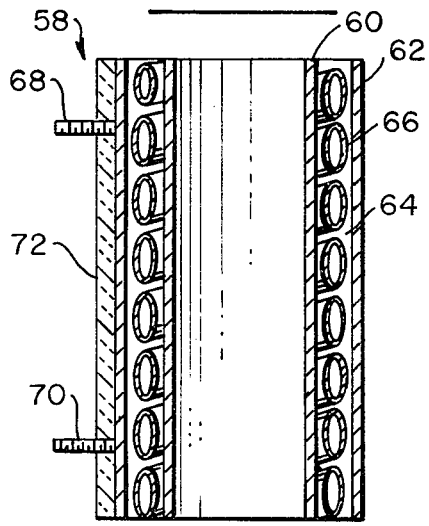
FIG. 3 is a view in section of the method of fabricating another embodiment of an ice-making evaporator in accordance with the present invention.
Figure 4:
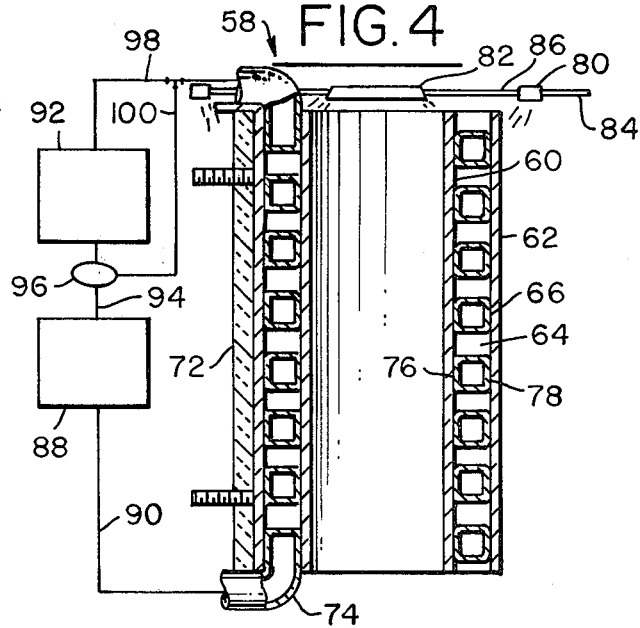
FIG. 4 is a view in section of the completed ice-making evaporator of FIG. 3 illustratively integrated into a heat pump system.

A modified version of an ice-making evaporator 58 is shown in FIGS. 3 and 4. In this embodiment, two elongated tubular members 60, 62 are provided. Tube 60 is placed inside of tube 62. The outer diameter of tube 60 is substantially less than the inner diameter of tube 62, thus leaving a space 64 therebetween. The tubes 60, 62 are preferably fabricated of a corrosion resistant and heat conductive material such as copper, a copper alloy, or stainless steel.

In one embodiment, the inner tube 60 had an outside diameter of 5½ inches with a wall thickness of 0.065 inch. The outer tube 62 had an outside diameter of 6 inches and a wall thickness of 0.065 inch, resulting in the space 64 being approximately one-half inch.

A tubular helical coil 66 is provided in the space 64 between tubes 60, 62. Initially, the tube forming coil 66 is somewhat flattened so that it is substantially oval in cross section, as shown in FIG. 3. This permits the coil 66 to be received over tube 60. It is then easy to insert the outer tube 62 over the coil 66. A pair of studs 68, 70 are provided on tube 62 for mounting purposes. A narrow layer of heat insulating material 72 is provided on tube 62 to prevent formation of ice on the outer surface thereof over a small area. This permits a suction line 74 to be brought out from the bottom of the evaporator 58. Ice which forms on the outer surface of tube 62 will thus not be a complete cylinder. Such ice may fall downwardly without impinging against the suction line 74.

As previously mentioned in connection with the embodiment of FIGS. 1 and 2, the material forming the coil 66 is preferably dead soft copper or a copper alloy. This permits the coil to be readily expanded by means of fluid pressure as hereinbefore described. When pressure is applied to the interior of coil 66, the coil changes shape with the result that relatively large flat surface areas 76, 78 are placed in pressure contact with, respectively, the inner surface of tube 62 and the outer surface of tube 60. This large surface contact area results in good heat exchange relationship between the tubes 60, 62 and coil 66.

After the ice-making evaporator 58 is fabricated, it may be installed as part of a heat pump system, as illustrated in FIG. 4. As there shown, outer and inner annular nozzles 80, 82 are mounted above the evaporator 58. These nozzles are supplied with water via inlet tubes 84, 86. The outer nozzle 80 sprays water against the outer surface of tube 62 while the inner nozzle 82 sprays water against the inner surface of tube 60.

The suction line 74 at the lower end of coil 66 is connected to a compressor 88 of a heat pump system via line 90. The compressor 88 outlet is connected to the inlet of condenser 92 via line 94. A bypass valve 96 is provided in line 94. The outlet of the condenser 92 is connected to the upper end of coil 66 via line 98. A line 100 bypasses condenser 92 from the valve 96.

In operation of the ice-making evaporator 58, water is sprayed onto the tubes 60, 62 via nozzles 80, 82. At the same time, high pressure liquid refrigerant is passed through evaporator 58 from the condenser 92. The heat given off by the condenser 92 is used for heating purposes as is conventional in a heat pump system. The liquid refrigerant expands in coil 66, resulting in the coil 66 being below the freezing temperature of water. As a consequence, a layer of ice is formed on the inner surface of tube 60 and the outer surface of tube 62. When it is desired to harvest these cylinders of ice, the bypass valve 96 is actuated to bypass hot compressor gases through the coil 66 via line 100. As previously described, this causes the contacting surfaces of cylinders of ice to melt, thereby resulting in the cylinders of ice falling off the evaporator 58. The process is then repeated as long as the heat pump system is in operation.

While the evaporator 58 has been described in connection with use in a heat pump system, it will be appreciated that it may be used in other systems as described in connection with the embodiment of FIGS. 1 and 2.

Having thus described my invention, I claim:

1. An ice-making evaporator comprising an elongated hollow tubular member having an outer surface and inner surface and having a bottom end and a top end wherein the bottom end is adapted to be installed lower than the top end, said bottom end of the tubular member being completely open, a baffle covering part of the top end of the hollow tubular member for directing water passed into the top end of the tubular member toward the sides thereof and permitting free flow of water through the baffle to the sides of the tubular member from the top end thereof toward the bottom end thereof on the inner surface thereof, a relatively soft metallic helical tubular coil for the member, said coil having flattened surface portions of substantial area fluid-pressure expanded in pressure contact with the outer surface of the tubular member, one end of the coil being a fluid inlet and the other end of the coil being a fluid outlet, whereby water sprayed onto the baffle at the upper end of the hollow tubular member may be frozen as it progresses from the top end of the tubular member toward the bottom end of the tubular member for subsequent removal from the bottom end of the tubular member as ice, the coil having a plurality of convolutions in spaced apart relation axially of the hollow tubular member, and further including a second helical tubular coil having convolutions alternating with that of the first tubular coil, which second coil also has flattened surface portions of substantially fluid pressure expanded in pressure contact with the tubular member with one end portion of the second coil also being a fluid inlet and the other end of the second coil being a fluid outlet whereby ice formed on the inner surface of the hollow tubular member may be released therefrom for subsequent removal from the bottom end of the tubular member by gravity on passing of a heated substance through said second coil.

2. Structure as set forth in claim 1, wherein the second coil is of smaller cross section than the first mentioned coil.

* * * * *